(12) United States Patent  (10) Patent No.: US 9,208,211 B2
Surtani et al.  (45) Date of Patent: Dec. 8, 2015

(54) PERFORMING OBJECT RELATIONAL MAPPING FOR A DATA GRID

(75) Inventors: Manik Surtani, London (GB); Galder Zamarreño, Neuchatel (CH)

(73) Assignee: Red Hat, Inc., Raleigh, NC (US)

( * ) Notice: Subject to any disclaimer, the term of this patent is extended or adjusted under 35 U.S.C. 154(b) by 317 days.

(21) Appl. No.: 13/070,314

(22) Filed: Mar. 23, 2011

(65) Prior Publication Data

US 2012/0246190 A1 Sep. 27, 2012

(51) Int. Cl.
 *G06F 17/30* (2006.01)
(52) U.S. Cl.
 CPC .... *G06F 17/30584* (2013.01); *G06F 17/30575* (2013.01)
(58) Field of Classification Search
 CPC ............ G06F 17/30584; G06F 17/30575
 USPC ......................................................... 707/769
 See application file for complete search history.

(56) References Cited

U.S. PATENT DOCUMENTS

| | | | | |
|---|---|---|---|---|
| 5,390,316 | A * | 2/1995 | Cramer et al. | 709/201 |
| 6,496,865 | B1 | 12/2002 | Sumsion et al. | |
| 6,549,918 | B1 | 4/2003 | Probert et al. | |
| 6,594,700 | B1 | 7/2003 | Graham et al. | |
| 6,633,883 | B2 * | 10/2003 | Koskas | 1/1 |
| 2002/0073236 | A1 * | 6/2002 | Helgeson et al. | 709/246 |
| 2002/0107992 | A1 * | 8/2002 | Osbourne et al. | 709/310 |
| 2002/0111972 | A1 | 8/2002 | Lynch et al. | |
| 2002/0165727 | A1 * | 11/2002 | Greene et al. | 705/1 |
| 2002/0198908 | A1 | 12/2002 | Hartel | |
| 2003/0204273 | A1 * | 10/2003 | Dinker et al. | 700/48 |
| 2003/0212660 | A1 * | 11/2003 | Kerwin | 707/1 |
| 2007/0294261 | A1 | 12/2007 | Neuneier et al. | |
| 2008/0195646 | A1 * | 8/2008 | Meijer et al. | 707/102 |
| 2010/0010967 | A1 * | 1/2010 | Muller | 707/3 |
| 2010/0287200 | A1 * | 11/2010 | Dhuse | 707/770 |
| 2010/0318498 | A1 * | 12/2010 | Swarnakar | 707/693 |
| 2011/0107165 | A1 * | 5/2011 | Resch et al. | 714/746 |
| 2011/0225143 | A1 | 9/2011 | Khosravy et al. | |
| 2012/0246202 | A1 | 9/2012 | Surtani et al. | |

OTHER PUBLICATIONS

Dibbits, Daniel, et al., "Oracle Real Application Clusters in Oracle VM Environments", An Oracle Technical White Paper, Jun. 2010, Version 1.6, 37 pages, Oracle, Redwood Shores, California.

Fennelly, Tom, "Infinispan WebSocket Server, Version 7" created Apr. 19, 2010, last modified Jul. 16, 2010 by Galder Zamarreño, 4 pages, JBoss Community: Infinispan, http://community.jboss.org/wiki/InfinispanWebSocketServer.

Gualtieri, Mike, "NoSQL and Elastic Caching Platforms Are Kissing Cousins" Feb. 20, 2010, 4 pages.

MacDonald, Mark, et al., "Oracle Grid: The Optimal Platform for Siebel Solutions", An Oracle Business White Paper, Dec. 2009, 15 pages, Oracle, Redwood Shores, California.

Markus, Mircea, "Continuous Query with Infinispan, Version 15" Oct. 14, 2010, 5 pages, JBoss Community: Infinispan, http://community.jboss.org/wiki/ContinuousQuerywithInfinispan.

(Continued)

*Primary Examiner* — Shiow-Jy Fan
(74) *Attorney, Agent, or Firm* — Lowenstein Sandler LLP

(57) ABSTRACT

A node in a data grid receives a client request to store an object in a database, the request including the object. The node divides the object into a plurality of key value pairs and links the plurality of key value pairs. The node then stores the plurality of key value pairs in the data grid.

13 Claims, 9 Drawing Sheets

(56) References Cited

OTHER PUBLICATIONS

Neale, Michael, "Infinispan REST server, Version 29" Aug. 30, 2009, 7 pages, JBoss Community: Infinispan, http://community.jboss.org/wiki/InfinispanRESTserver.

Surtani, Manik, "Data-as-a-Service: The data fabric for clouds" May 19, 2010, 3 pages, published on Javalobby http:java.dzone.com.

Surtani, Manik, "Infinispan for the Power-user: Cache Modes" Mar. 30, 2010, 6 pages, published on Architects Zone http:architects.dzone.com.

Surtani, Manik, "Infinispan for the Power-user: Event Notifications" May 4, 2010, 3 pages, published on Javalobby http:java.dzone.com.

Surtani, Manik, "Infinispan for the Power-user: Remoting" Feb. 26, 2010, 2 pages, published on Architects Zone http:architects.dzone.com.

Surtani, Manik, "Querying Infinispan, Version 14" created Sep. 23, 2009, last modified Sep. 7, 2010 by Galder Zamarreño, 6 pages, JBoss Community: Infinispan, http://community.jboss.org/wiki/QueryingInfinispan.

Zamarreño, Galder, "Infinispan Server Modules, Version 12" Jul. 9, 2010, 5 pages, JBoss Community: Infinispan, http://community.jboss.org/wiki/InfinispanServerModules.

Zamarreño, Galder, "Tree API Module, Version 14" Nov. 8, 2010, 5 pages, JBoss Community: Infinispan, http://community.jboss.org/wiki/TreeAPIModule.

Zamarreño, Galder, "Using Infinispan Memcached Server, Version 18" Jan. 18, 2010, 3 pages, JBoss Community: Infinispan, http://community.jboss.org/wiki/UsingInfinispanMemcachedServer.

USTP Office Action for U.S. Appl. No. 13/070,338, mailed Jul. 31, 2012.

No Author, "Google Search, Datagrid Supporting Multiple Protocols," Sep. 24, 2014, 2 pages, World Wide Web, https://www.google.com/?gws_rd=ssl#q=datagrid+supporting+multiple+protocols+%2Btranslate+request+%2Bdifferent+format+[Sep. 24, 2014 5:51:29 PM].

USPTO, Notice of Allowance for U.S. Appl. No. 13/070,338 mailed Sep. 30, 2014.

USPTO, Office Action for U.S. Appl. No. 13/070,338 mailed May 1, 2014.

USPTO, Final Office Action for U.S. Appl. No. 13/070,338 mailed Dec. 21, 2012.

USPTO, Advisory Action for U.S. Appl. No. 13/070,338 mailed Feb. 25, 2013.

* cited by examiner

PERFORMING OBJECT RELATIONAL MAPPING FOR A DATA GRID

RELATED CASES

The present application is related to co-pending U.S. patent application Ser. No. 13/070,338, filed Mar. 23, 2011, entitled "DATA GRID SUPPORTING MULTIPLE PROTOCOLS."

TECHNICAL FIELD

Embodiments of the present invention relate to data grids, and more specifically to using data grids to provide data as a service (DaaS) functionality.

BACKGROUND

Cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing providers currently offer infrastructure as a service (IaaS) and platform as a service (PaaS). IaaS is a provision model in which equipment such as storage equipment, computing equipment, networking equipment, etc. is provided on a per use basis. PaaS is a provision model in which a computing platform and solution stack are delivered to clients as a service on a per use basis. Each of these services has the properties of elasticity (ability to deal with new nodes being added and existing nodes being removed dynamically), high availability, scalability, and linear response times.

One service that has not been successfully moved to the cloud computing model is managed data storage, which is conventionally performed by databases. Data storage is stateful, which makes data as a service (DaaS) much more challenging than any of the other categories of cloud computing. Traditional data storage uses databases such as structured query language (SQL) and not only SQL (NoSQL) databases. Databases do not scale, so they tend to run on a single machine or a few machines running in a fixed cluster. Therefore, databases are not distributed by nature. This becomes a problem in the cloud because in clouds there is no guarantee that a particular server will be available at any given time. The lack of distribution for databases hampers elasticity and high availability, two of the requirements for cloud computing services. Therefore traditional database data storage does not work for DaaS.

BRIEF DESCRIPTION OF THE DRAWINGS

The present invention is illustrated by way of example, and not by way of limitation, in the figures of the accompanying drawings and in which.

DETAILED DESCRIPTION

Described herein are a method and apparatus for performing object relational mapping for a data grid. A node in a data grid receives a client request to store an object in a database, the request including the object. The node divides the object into a plurality of key value pairs and links the plurality of key value pairs to each other. In one embodiment, the data grid node generates a primary key value pair for the object, and additional key value pairs for each field in the object. The data grid node adds references to the additional key value pairs into the value portion of the primary key value pair. If the object includes any internal objects, then the data grid node generates an additional primary key value pair for each of the internal objects. The node then stores the plurality of key value pairs in the data grid.

Unlike traditional object relational mapping, the object relational mapping performed by embodiments of the present invention map an object to a collection of linked key value pairs. An object may be a record to be added to a database, a portion of a database record (e.g., a field), an in memory data structure, or any other data. These key value pairs are then stored in a data grid (e.g., a distributed data grid) rather than in a database. The data in the data grid can be distributed across the data grid nodes. Therefore, stateful data can be maintained in a reliable, highly available, linearly scalable and elastic manner. Accordingly, embodiments of the present invention enable a data grid to provide data as a service (DaaS) functionality.

Figure 1:
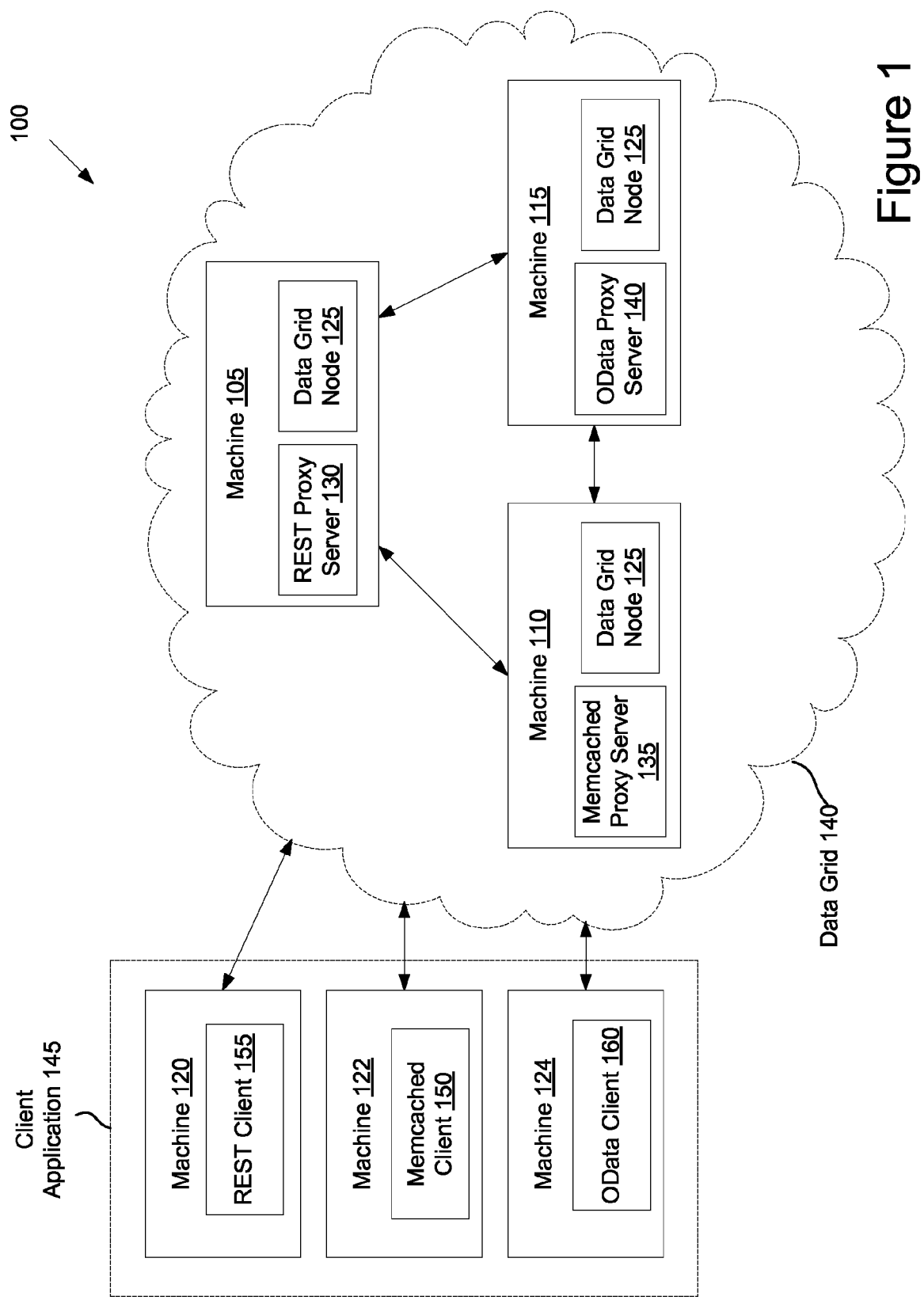
FIG. 1 illustrates an exemplary network architecture, in which embodiments of the present invention may operate.

FIG. 1 illustrates an exemplary network architecture 100, in which embodiments of the present invention may operate. The network architecture 100 includes multiple machines 105, 110, 115, 120 connected via a network (not shown). The network may be a public network (e.g., Internet), a private network (e.g., a local area Network (LAN)), or a combination thereof.

Machines 105, 110, 115, 120 may be hardware machines such as desktop computers, laptop computers, servers, or other computing devices. Each of the machines 105, 110, 115, 120 may include an operating system that manages an allocation of resources of the computing device (e.g., by allocating memory, prioritizing system requests, controlling input and output devices, managing file systems, facilitating networking, etc.). In one embodiment, one or more of the machines 105, 110, 115, 120 is a virtual machine. For example, one or more of the machines may be a virtual machine provided by Amazon® Elastic Compute Cloud (Amazon EC2), a VMWare® virtual machine, etc. In some instances, some machines may be virtual machines running on the same computing device (e.g., sharing the same underlying hardware resources). In one embodiment, one or more of the machines 105, 110, 115 is a java virtual machine (JVM), which may run on a hardware machine or on another virtual machine.

Machines 105, 110, 115 each include a data grid node 125 that runs on the machine. The data grid node 125 is a data grid application, such as an instance of JBoss® Infinispan®, Oracle® Coherence® or Hadoop™. Each data grid node 125 may act as a server for data to clients and as a peer to other data grid nodes 125. Data grid nodes 125 are discussed in greater detail below with reference to FIG. 2A.

The data grid nodes 125 may communicate via the network to form a data grid 140. This may include using peer-to-peer protocols to establish and manage membership of the data grid 140. The peer-to-peer protocols may include functionality for group creation and deletion, peer discovery, peer communication, and so on. In one embodiment, JGroups is used as an underlying peer-to-peer communication mechanism. Alternatively, other peer-to-peer protocols may be used.

The data grid 140 is a data store that spans multiple machines 105, 110, 115 that are joined in a dynamic cluster. In one embodiment, the data grid 140 is a NoSQL based data store. The data grid 140 can be provided to clients using a DaaS model. In one embodiment, the data grid 140 operates in a client-server mode, in which the data grid 140 serves resources (e.g., a stateful data store such as a cache) to client applications 145. In one embodiment, the data grid 140 acts as a shared storage tier for client applications 145. A separate memory space may be generated for each client application 145.

The data grid 140 may include a volatile in-memory data structure such as a distributed cache. The data grid 140 may also provide a persistent data structure (e.g., a data structure stored in non-volatile disk storage). In one embodiment, the data grid 140 provides a distributed cache with write through or write behind to persistent storage. In one embodiment, Amazon Simple Storage (S3) platform hosts the data for the data grid 140 as part of a cache store. Other key value based storage systems may also be used to host the data grid's 140 data.

In one embodiment, the data grid 140 is indistinguishable from a database to users and client applications 145. Therefore, client applications 145 may use conventional database formats, protocols and semantics for communicating with the data grid 140. For example, client applications 145 may communicate with the data grid 140 using the memcached protocol, the REST protocol, the OData protocol, the Websockets protocol, SQL, etc.

However, unlike a database, the data grid 140 actually distributes stored data across multiple machines 105, 110, 115. The data grid 140 is elastic (can deal with new nodes being added and nodes being removed), scalable and highly available. The data grid 140 may also perform load balancing and failover of individual data grid nodes 125. Therefore, the data grid 140 performs the functions normally provided by databases, but can provide these functions using a DaaS model.

In one embodiment, the data grid nodes 125 form a distributed cluster, which causes the data grid 140 to be a distributed data grid. This enables the data grid 140 to scale linearly as more data grid nodes 125 are added to the cluster. In one embodiment, distribution makes use of a consistent hash algorithm to determine where in the cluster entries should be stored. The hashing algorithm may be configured to maintain a specified number of copies of each entry in the data grid 140. In one embodiment, the hashing algorithm is deterministic in locating entries without resorting to multicasting requests or maintaining expensive metadata.

In one embodiment, the data grid 140 provides a rich and powerful application programming interface (API) that looks and feels like a database. A client may communicate with any data grid node 125 of the data grid 140 to access data stored in the data grid 140. A data grid node 125 may receive database commands, such as commands to store objects, to retrieve objects, to perform searches, etc. When a data grid node 125 receives a command to store an object, the data grid node 125 divides the object into a collection of linked key value pairs. The data grid node 125 then stores some or all of these key value pairs. Additional data grid nodes 125 may also store some or all of the key value pairs.

When any of the data grid nodes 125 receives a request for the stored object, that data grid node 125 gathers up all of the key value pairs for that object, and reconstructs the object from the key value pairs. This may involve requesting the key value pairs from one or more other data grid nodes 125. Once the object is reconstructed, the data grid node 125 returns the object to the client from which the request was received.

The data grid nodes 125 are each configured to operate using a specific protocol. Therefore, the data grid nodes 125 expect to receive objects having a specific type and commands having a specific format. The data grid nodes operate on objects having a predefined type. In one embodiment, the data grid nodes operate on Java objects and/or on Javascript object notation (JSON) objects. Client applications 145 may communicate with the data grid 140 using the specific protocol that the data grid 140 uses to manage data. In one embodiment, the data grid nodes 124 are configured to respond to commands formatted in a key value based NoSQL database format. Alternatively, clients may communicate with the data grid 140 using additional protocols.

To enable clients configured for different protocols to access the data grid 140, the data grid 140 may include one or more proxy servers 130, 135, 140. Each proxy server 130, 135, 140 may be used to translate objects and requests into the specific formats used by the data grid nodes 125. Each proxy server 130, 135, 140 includes internal rules on how to translate an incoming protocol into a protocol used by the data grid 140, and how to translate responses going out from the protocol used by the data grid 140 into the protocol used by the client application 145 or by a specific component 150, 155, 160 of the client application 145.

In one embodiment, one or more of the data grid nodes 125 is collocated with a proxy server 130, 135, 140. Additionally, a data grid node 125 may be collocated with multiple proxy servers 130, 135, 140. The proxy servers 130, 135, 140 provide a layer of indirection for the data grid 140. Each proxy server 130, 135, 140 is configured to translate objects and requests between the specific protocol supported by the data grid nodes 125 and an external protocol. Examples of proxy servers include a REST proxy server 130, a memcached proxy server 135 and an OData proxy server 140. Other examples of proxy servers include a web socket proxy server, etc.

Each proxy server 130, 135, 140 may be an endpoint that appears to client applications 145 as a backend storage server. Client applications 145 may communicate with the proxy servers 130, 135, 140 as though the proxy servers are full backend storage servers. Each proxy server 130, 135, 140 may be configured to listen to a specific port or ports, and act on messages sent to those ports.

To use the data grid 140, a client application 145 acquires a session from the data grid 140, and sends commands to the data grid 140 via the session. Client application 145 may be a standalone application running on a single machine. Alternatively, client application 145 may be a system with multiple clients 150, 155, 160, each of which may run in a separate machine 120, 122, 124. The clients 150, 155, 160 may each run on a different system, use a different protocol, be written in a different language, operate on a different platform, etc. For example, a web application may have a Java middleware component that serves up web applications, and another component that is a part of one of the web applications. For example, if a web application uses Ajax and client side java script in a user's browser, the user's browser may communicate directly to the data grid 140 to populate the browser's screen. A third component of the client application 145 may be a python script that monitors all data and processes orders as and when they are placed in the data grid 140.

In one example embodiment, the client application 145 includes a memcached client 150, a REST client 155, and an OData client 160. Each of these clients 150, 155, 160 may communicate with the distributed data grid 140 using their specific protocols. In one embodiment, each client is configured to communicate with a particular proxy server (e.g., is configured with a network address of the particular proxy server). Each client may also be configured with network addresses of multiple proxy servers, and may be able to fail over across the proxy servers. For example, each client may be configured with a network address or addresses for a cluster of proxy servers, wherein each proxy server in the cluster handles communications formatted according to the protocol used by the client. In one embodiment, a load balancer (e.g., an HTTP load balancer for a REST proxy server 130) manages load for the cluster. Examples of HTTP load balancers include Apache® mod_cluster, Jboss® mode_cluster, Big-IP®, etc. Other load balancers may be used for the REST proxy servers and/or for other proxy servers.

In an example, the REST client 155 may send an object and request formatted according to the REST protocol to the distributed data grid 140. The request and object may be received by the REST proxy server 130 and translated into the backend protocol used by data grid nodes 125. The data grid nodes 125 may then perform one or more operations in response to the request.

In one embodiment, communications may be routed to an appropriate proxy server 130, 135, 140, which may then translate the communications into the protocol used by the data grid nodes 125 on the back end (e.g., into a key value based NoSQL database format). In one embodiment, each data grid node 125 includes a request router (not shown). Additionally, or in the alternative, each proxy server may include a request router. The request router may determine, based on a format of a received communication, the protocol in which the communication was formatted. For example, the request router may include different communication categorization rules. If a received communication satisfies, for example, a REST protocol communication categorization rule, the data grid node 125 may determine that the communication is formatted according to the REST protocol. The request router may forward the communication to an appropriate proxy server that is configured to handle communications having the determined protocol. In one embodiment, the request router includes a table of proxy servers, each entry in the table including one or more addresses for proxy servers and an associated protocol. The table may be used to determine a proxy server to forward a communication to.

Figure 2A:
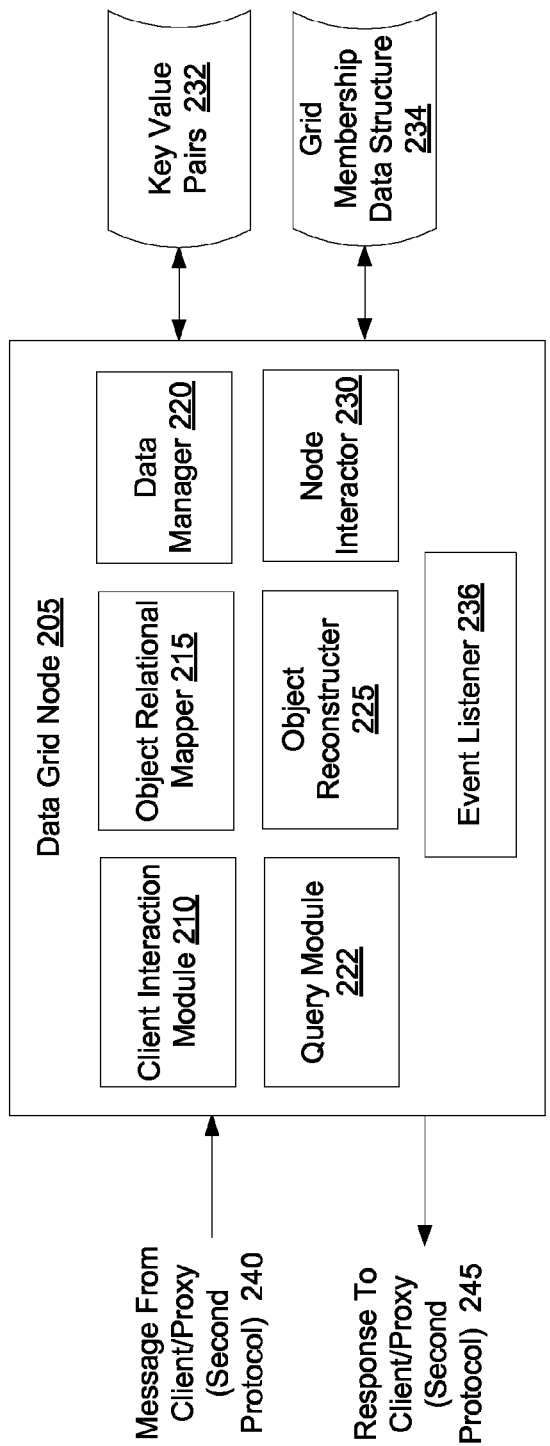
FIG. 2A illustrates a block diagram of a data grid node, in accordance with one embodiment of the present invention.

FIG. 2A illustrates a block diagram of a data grid node 205, in accordance with one embodiment of the present invention. The data grid node 205 may correspond to a data grid node 125 of FIG. 1. In one embodiment, the data grid node 205 is collocated on a machine with one or more proxy servers 250. In one embodiment, the data grid node 205 runs in a java virtual machine (JVM) environment. The JVM may run in another environment, such as Windows® OS or Linux® OS. Alternatively, the data grid node 205 may run in other environments (e.g., directly on a Windows® OS, on a Linux® OS, etc.).

The data grid node 250 operates in a cluster with other data grid nodes to form a data grid. Each data grid node 250 may act as a server for the data grid. Therefore, a client may access any of the data grid nodes 250 to gain access to the entire data grid. New data grid nodes can be started and connected to the other data grid nodes without performing rehashing or state transfer. Therefore, startup times for new data grid nodes can be predictable and relatively short.

In one embodiment, the data grid node 250 includes a client interaction module 210, an object relational mapper 215, a data manager 220, a query module 222, an object reconstructer 225, a node interactor 230 and an event listener 236. The node interactor 230 makes use of internet protocol (IP) based networking (e.g., transmission control protocol (TCP), user datagram protocol (UDP), etc.) to communicate with other data grid nodes. In one embodiment, the node interactor 230 issues remote procedure calls (RPCs) to neighbor nodes. The neighbor nodes invoke the RPCs, generate a response, and return the response to the data grid node that generated the RPCs. In one embodiment, the node interactor 230 uses JGroups Transport to communicate with other data grid nodes.

Node interactor 230 performs peer discovery and manages membership of the data grid. In one embodiment, node interactor 230 maintains a grid membership data structure 234 that includes entries for each data grid node in the data grid. Each entry may include an address and/or a port of a data grid node. This membership data structure 234 may be used to determine which neighbor nodes to communicate with.

The client interaction module 210 receives requests from clients and sends responses to clients. Requests may include requests to store objects, to retrieve objects, to search for objects, to retrieve information about objects, and so on. Responses may include objects, information about objects, confirmation messages, error messages, etc. The requests and responses are configured in a specific format understandable to the data grid node 205. Received requests may have been translated into the specific format by a proxy server. In one embodiment, the requests and responses have a key value based NoSQL database format. For example, the requests, responses and/or objects (payloads) may have a simple format of keys mapped to values.

A number of operations can be performed on the data grid such as get, put, remove, notify and unnotify. Getting and updating data in the data grid may be performed by calling the get, put and remove functions on an instance of the data grid. These operations could be triggered by user interaction with a web form, for example. In one embodiment, a callback function is registered with the data grid for the get and notify operations. This callback function receives all add/update/remove notifications entries in the data grid for which the notify function was invoked.

Requests to store objects include the objects that are to be stored. These objects may be objects of a specific type that the data grid node 205 is configured to operate on. Object relational mapper 215 performs object relational mapping for data grids on received objects. In one embodiment, the object relational mapper 215 operates on java objects such as plain old java objects (POJOS). In one embodiment, the object relational mapper 215 operates on extensible JavaScript Object Notation (JSON) objects and/or JSON arrays. Alternatively, the object relational mapper 215 may operate on objects that are in the form of extensible markup language (XML) data.

A JSON object is an unordered collection of name value pairs. The values can be of the following types: Boolean, JSONArray, JSONObject, Number, String, or JSONObject-.null. The external form of a JSON object is a string wrapped in curly braces with colons between the names and the values, and commas separating name value pairs. The internal form is an object having get and opt methods for accessing values by name, and put methods for adding or replacing values by name. A JSON object constructor can convert a JSON object from the external form to the internal form.

In one embodiment, the data grid node 205 includes one or more event listeners 236. Event listeners 236 may be configured to monitor for specific types of events, and to notify clients when events occur. For example, an event listener 236 may be configured to listen for changes to specific objects, and to report such changes to particular clients. The event listener 236 may be configured to notify a client before an event occurs and/or after the event occurs. Notifications may be dispatched synchronously or asynchronously.

Conventional object relational mapping maps objects to tables. However, tables do not scale, and so are inappropriate for use in a data grid. In contrast, the object relational mapping for data grids performed by object relational mapper 215 maps objects to a collection of key value pairs. These key value pairs may be maintained in a cache and/or may be stored in persistent storage. For example, the key value pairs may be stored as files in a file system or in another format for persistent storage. The format of the persistent storage and/or cache may be configurable.

A distinct key value pair may be generated for each field of the object. The key for a key value pair may be based on the field, and the value may be the contents of that field. In one embodiment, a primary key value pair is generated for the object that will be used as a unique identifier for the object. A primary key value pair is a key value pair that is used to reference the object and to link the key value pairs generated from the object. The key for the primary key value pair may be the object's unique identifier. The values in the primary key value pair include references (e.g., pointers) to other key value pairs of the object. The primary key value pair may have references to all of the other key value pairs generated from the object, or to just some key value pairs. In one embodiment, the primary key value pair includes references to key value pairs generated for each primitive field (e.g., string, Boolean, integer, etc.) included in the object, and to additional primary key value pairs for each complex field.

Consider an example of a received user object such as a java user object. The user object may include fields for a user name, a user age and a user address. Each field may have a type of "string." The object relational mapper 215 breaks this object up into key value pairs. A unique identifier (e.g., a universally unique identifier (UUID)) is generated for the object and used as the key for the primary key value pair. A separate key value mapping is generated for each field (e.g., for each attribute). The generated key value pairs may include "user1_name: John Doe," "user1_address: 123 Clipper Way," and "user1_age: 72." These key value pairs may be stored in the data grid and distributed across the grid. That way the stored object is fault tolerant and highly available.

The object relational mapper 215 is able to handle complex objects. A complex object is an object that has at least one complex field (a field that has a type other than a primitive type) or a relationship to another object or array. A complex field represents an internal or nested object. An object may include multiple layers of nested objects. For example, an object may include a complex field, which in turn may include another complex field, which may include another complex field, and so on. An additional layer of indirection may be introduced by each layer.

For a complex object, each internal object may be assigned its own primary key and its own unique identifier. Relationships between objects may be handled by using references (e.g., pointers) between primary key value pairs. Consider an example in which one object has a relationship to another object. The object that has the relationship to the other object would store in its primary key a reference to the unique identifier of that other object. The reference may be a pointer that resembles an in memory pointer except that instead of storing a memory reference, a UUID is stored.

In one embodiment, it is the responsibility of clients to designate unique identifiers for objects. The unique identifier designation may be included in the request to store the object. Alternatively, the data grid node 205 may generate unique identifiers for received objects and/or for internal objects of received objects. For example, a first field in the object may be used to generate a unique identifier for the object. A client may later retrieve an object based on that object's unique identifier. Note that the client does not need to remember the unique identifier for the object in one embodiment. Instead, the client may perform a query to determine the unique identifier for the object.

Object reconstructor 225 reconstructs objects from key value pairs 232. When a client needs to retrieve a stored object, the client sends the data grid node 205 a message 240 that includes the unique identifier for that object. The unique identifier may be a primary key in a primary key value pair that was generated for the object. The object reconstructor 225 gathers up all of the key value pairs 232 associated with that object, and puts them back together to reform the object.

In one embodiment, the object recontructor 225 retrieves the primary key value pair that was generated for the object using the unique identifier. That primary key value pair includes references to key value pairs for each of the fields of that object. The primary key value pair and/or additional key value pairs may be stored on the data grid node 205 or on other data grid nodes. If any of the key value pairs are not stored on the data grid node 205, node interactor 230 communicates with other data grid nodes to retrieve those key value pairs 232.

If the object included an internal object (a complex field), then the primary key value pair includes a reference to another primary key value pair of the internal object. That internal object may have its own unique identifier, and may also have been divided into key value pairs. On retrieving the primary key value pair for the internal object (complex field), the object reconstructor 225 uses references included in that primary key value pair to retrieve additional key value pairs. This process continues until all key value pairs for the object and all internal objects have been retrieved.

Once all key value pairs are retrieved, the object reconstructor 225 uses those key value pairs to reconstruct the original object. The object can be reconstructed with all internal objects, references, types, values, etc. that the object originally had before it was stored.

In one embodiment, the data grid node 205 supports multi-tenancy. Therefore, data from different applications can be isolated in the same data store. Having multi-tenancy enabled allows different applications to store data having the same name or same primary key without any of this data being overwritten. Therefore, changes made to objects in a first application do not cause any modifications to objects of a second application, even if those objects share the same name and unique identifier. Thus, multi-tenancy provides a way to isolate data while still sharing the same data store. Data associated with different applications may be distinguished by using name spacing, in which the application's unique identifier as attached to the object's unique identifier in each primary key. Therefore, the unique identifier for an object may be a combination of the application's unique identifier and the object's unique identifier.

In one embodiment, data grid node 205 adds annotations to objects for indexing. For example, object relational mapper 215 may add annotations to key value pairs as they are generated. In one embodiment, data grid node 205 includes a query module 222. The query module 222 indexes objects stored in the data grid based on the annotations, and enables clients to perform searches on the objects. This enables clients to obtain objects within the data grid without needing to know the unique identifiers (primary keys) to each object that the client wants to obtain. For example, a user may search for the field name, and the name john. The query module 222 may then search the key value pairs for the value "john" in a key for the name field. For every match, the query module 222 may identify the object associated with that key value pair and the unique identifier for that object. This information may be returned to the client. In one embodiment, queries are expressed in Drools query language. Alternatively, other query languages may be used. For example, queries may be defined in XML, or may be Apache® Lucene® queries.

In one embodiment, the query module 222 provides fault tolerant queries. If the data grid node 205 crashes while executing a query, another data grid node will continue performing the query.

In one embodiment, data manager 275 keeps track of the number of references that are made to each object. If a reference count for an object is zero, then data manager 275 may enable that object to be deleted. This enables garbage collection.

Figure 2B:
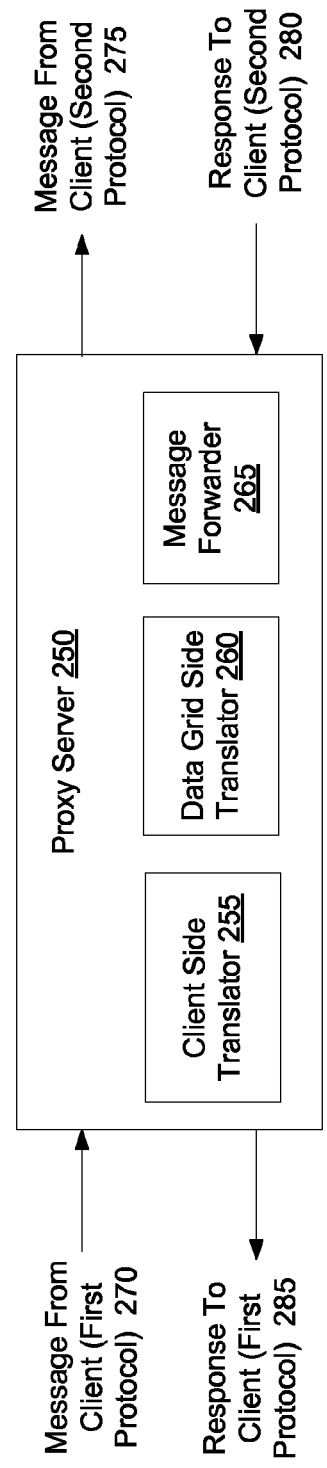
FIG. 2B illustrates a block diagram of a proxy server, in accordance with one embodiment of the present invention.

FIG. 2B illustrates a block diagram of a proxy server 250, in accordance with one embodiment of the present invention. The proxy server 250 may correspond to REST proxy server 130, memcached proxy server 135, or OData proxy server 140 of FIG. 1. The proxy server 250 may also be another type of proxy server, such as a Websocket proxy server. In one embodiment, the proxy server 250 is installed on a machine that includes a data grid node 205. For example, a proxy server 250 may run along with a data grid node 205 inside a single instance of a java virtual machine (JVM). Alternatively, the proxy server 250 may be installed on a machine that does not include any data grid nodes.

Each proxy server 250 listens on a specified port or ports. Clients connect to a port, send commands to the proxy server, read responses, and eventually close the connection. Each proxy server 250 provides a distinct mechanism (e.g., an application programming interface (API)) for connecting to the same data grid, and operates as a distinct endpoint for the data grid. For example, the REST proxy server includes a REST API that enables a REST client to interact with the data grid using standard hypertext transport protocol (HTTP) commands. By providing multiple protocols for communicating with the data grid, multiple different clients written in different languages, running on different platforms, and performing different actions can all use the same data.

In one embodiment, each proxy server 250 includes a client side translator 255, a data grid side translator 260 and a message forwarder 265. Proxy server 250 receives a message 270 from a client that is formatted according to a first protocol. The received message 270 may include an object (data) to be stored. Client side translator 255 receives this message and any object included in the message, and translates the message and/or the object into a second format that is compliant with a second protocol used by the data grid. In one embodiment, the object is translated into a java object or a JSON object. Message forwarder 265 then forwards the translated message 275 and object to the data grid.

The data grid generates a response message 280 having a format compliant with the second protocol, and sends this response to proxy server 250. The response 280 may include an object (e.g., if the message was a request for an object). Data grid side translator 260 translates the response message 280 and/or the object from the second protocol to a format compliant with the first protocol. For example, data grid side translator 280 may translate a JSON object into a binary array or base 64 encoded binary data. Message forwarder 265 then forwards the translated response 285 and/or object to the client. Therefore, each proxy server 250 is able to encode and decode data so that it is able to communicate with clients in a manner compliant to a first protocol and is able to communicate with data grid nodes in a manner compliant to a second protocol.

In one embodiment, the proxy server 250 is clustered with other proxy servers of the same type. This can enable the proxy server 250 to perform load balancing and failover. Clients wanting to load balance or failover between REST proxy servers can do so using any standard HTTP load balancer such as mod_cluster. Unlike conventional memcached servers, the memcached proxy servers can be clustered. Therefore, the memcached proxy servers can replicate or distribute data using, for example, consistent hash algorithms. Since websockets work on the HTTP port, any HTTP load balancer can be used to perform load balance and failover for a websocket proxy server.

In one embodiment, the proxy server 250 is a REST proxy server. The REST proxy server translates messages and data between a format compliant with the REST protocol and a format compliant with another protocol used by the data grid. The REST proxy server makes use of simple GET, PUT, REMOVE, etc. HTTP commands for communication with clients. To connect to the REST proxy server, any HTTP client can be used.

The REST proxy server enables clients to access data via universal resource locators (URLs). Clients may use HTTP PUT and POST commands to place data into the data grid, with URLs to address a storage data structure name (e.g., a cache name in the data grid) and keys associated with specific data (e.g., with a specific object or objects). Similarly, clients may use the HTTP GET command to retrieve data from the data grid. The data being stored and/or retrieved is the body of the request and/or response. This data can be any type of data, but is frequently base 64 encoded binary data.

A PUT request may have the form PUT/{cacheName}/{cacheKey}. This will place the payload (body) of the message in a given cache (data grid storage area), with a given key. For example, in the URL "http://someserver/hr/payroll/3", the "hr" is the cache name and "payroll/3" is the key. Using the PUT command, any existing data having this key in this cache will be replaced, and time-to-live and last-modified values, etc. will be updated. A POST command follows the same syntax as the PUT command, but will return an HTTP CONFLICT status if the object having the specified cache and key values already exists, and the content will not be updated.

To retrieve data, GET/{cachename}/{cachekey} syntax may be used. This will return the data found in the given cachename under the given key as the body of the response. A content-type header may be supplied that matches what the data was inserted as. In one embodiment, a unique ETag may be returned for an entry, as well as the last-modified header field indicating the state of the data in the given URL. Etags allow browsers (and other clients) to ask for data only in the case where it has changed. The HEAD command may be used with the same syntax as the GET command. However, only headers (no payload content) are returned with the HEAD command. Other REST commands may also be used.

The restrictions imposed on objects by the REST specification causes these objects to often be base 64 encoded binary data. In one embodiment, the REST proxy server wraps such base 64 encoded binary data into an internal java object (e.g., a JSON object). The REST proxy server may also translate the internal java object back into a base 64 encoded binary data.

In one embodiment, the proxy server 250 is a memcached proxy server. The memcached proxy server translates messages and data between a format compliant with the memcached text protocol and a format compliant with another protocol used by the data grid. This allows memcached clients to communicate with the data grid. Memcached clients communicate with the memcached proxy server through transmission control protocol (TCP) or user datagram protocol (UDP) connections. The memcached proxy server enables the distributed data grid to be used as a drop in replacement for conventional memcached servers. The memcached proxy server enables clients to use any of the numerous client libraries written for memcached. Any conventional memcached client can be used to connect to the memcached proxy server.

There are two types of data sent in the memcached protocol: text lines and unstructured data. Text lines are used for commands from clients and responses from the memcached proxy server. Unstructured data is sent when a client wants to store or retrieve data. The memcached proxy server will transmit back unstructured data in exactly the same way it received it, as a byte stream. Data stored using the memcached protocol is identified by a key, which is a text string that uniquely identifies the data.

Memcached includes six storage commands (set, add, replace, append, prepend and cas) and two retrieval commands (get and gets). Each storage command asks the memcached proxy server to store some data identified by a key. To store data, the client sends a command line, then a data block. The client then expects to receive one line of response, which indicates success or failure. The retrieval commands ask the server to retrieve data corresponding to a key or set of keys. The client sends a command line, which includes all of the requested keys. For each item, the server finds the data block and sends it to the client along with a single response line. The memcached proxy server wraps objects that are binary arrays (or other unstructured data) received from memcached clients using an internal java object (e.g., a JSON object). A binary array is an n-dimensional array, all of whose values are 1 or 0. The memcached proxy server may also translate internal java objects into binary arrays compliant with the memcached text protocol.

In one embodiment, the proxy server 250 is an OData proxy server. The OData proxy server translates messages and data between a format compliant with the OData protocol and a format compliant with another protocol used by the data grid. This allows OData clients to communicate with the data grid.

OData is a RESTful protocol that was designed to handle access to documents such as Word Documents. OData provides an HTTP based API for storing, retrieving and managing documents. The OData proxy server uses the OData protocol for an additional function that it was not designed for. Specifically, the OData proxy server uses the OData protocol to store data in key value pairs in the data grid (a NoSQL system). The OData proxy uses the OData protocol to write to and read from a key value based storage system (i.e., the data grid). When the OData proxy receives an OData request, it translates the request into the protocol supported by the data grid node. Therefore, the OData proxy uses the OData protocol for handling storage operations on arbitrary data rather than on the documents that OData was originally designed to operate on. The OData proxy provides an OData API, and translates it into a key value based NoSQL system format. The OData proxy allows developers to use any existing OData client library as a database driver, if it is backed by a NoSQL database rather than a traditional OData document store.

OData has functionality for querying. The built in querying function takes as an input a document name and uses this as a key to search for a specified document. The OData proxy server may instead use this same query function, but takes as an input a primary key (unique identifier for an object), and returns binary data rather than a document.

In one embodiment, the proxy server 250 is a websocket proxy server. The websocket proxy server translates messages and data between a format compliant with the websocket protocol and a format compliant with another protocol used by the data grid. A websocket proxy server thus enables the data grid to be exposed over a websocket interface via a javascript API. This allows websocket clients to communicate with the data grid.

Websocket defines a full-duplex communication channel to a web browser, operating over a single transmission control protocol (TCP) socket, and is exposed to the browser via a javascript interface. It is designed to be used with web browsers and servers, but can be used by any type of client or server application. The websocket proxy server may be designed for javascript clients, and may be particularly suited for developers wanting to enable access to the data grid from javascript code bases.

To establish a websocket connection, a client sends a websocket handshake request, and the server sends a websocket handshake response. Once established, websocket data frames can be sent back and forth between the client and the server in full-duplex mode. Text frames can be sent in full-duplex, in either direction at the same time. The data is minimally framed with just two bytes. Each frame starts with a 0x00 byte and ends with a 0xFF byte, and contains UTF-8 data in between. In one embodiment, the websocket proxy server translates objects between UTF-8 encoded data and Java objects or JSON objects.

Figure 3:
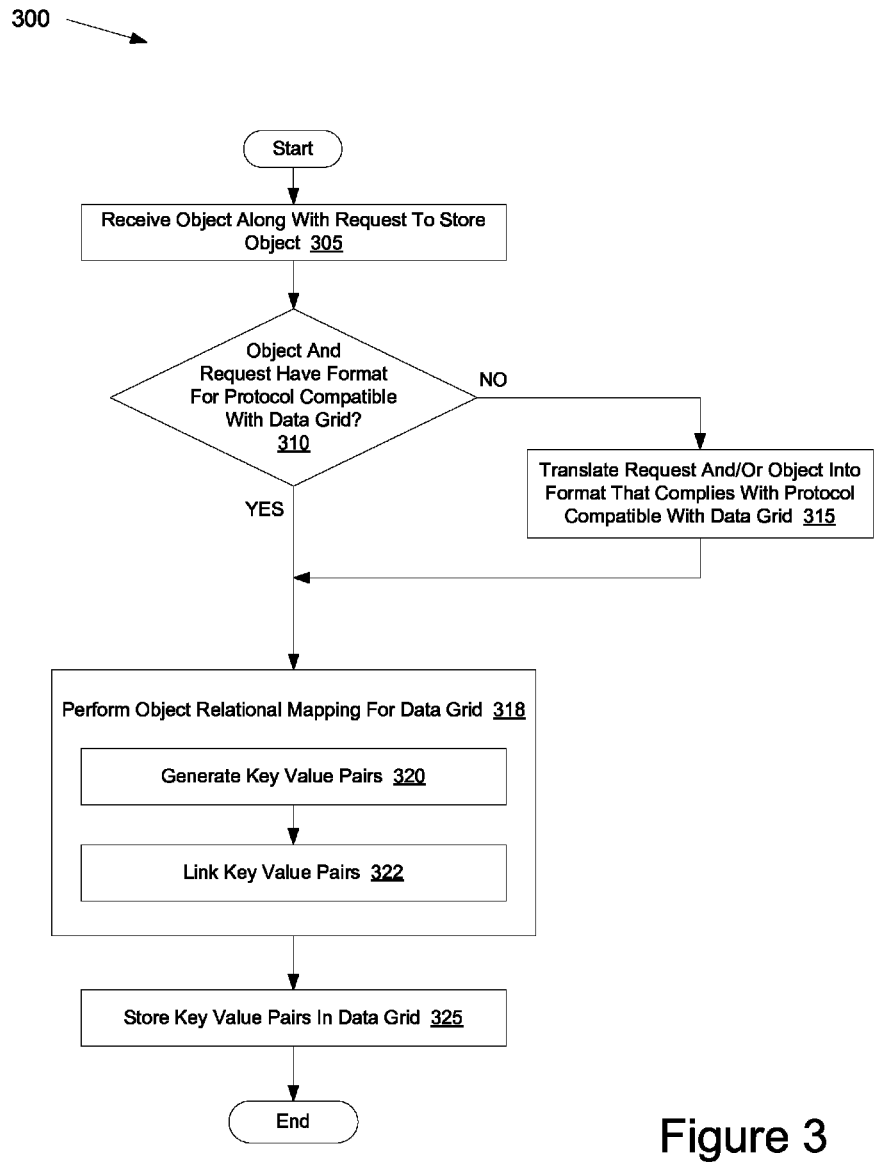
FIG. 3 illustrates a flow diagram of one embodiment for a method of storing an object in a distributed data grid.

FIG. 3 illustrates a flow diagram of one embodiment for a method 300 of storing an object in a distributed data grid. Method 300 enables a data grid to provide data as a service (DaaS) functionality. The method may be performed by processing logic that may comprise hardware (e.g., circuitry, dedicated logic, programmable logic, microcode, etc.), software (such as instructions run on a processing device), or a combination thereof. In one embodiment, method 300 is performed by a machine that includes a data grid node 125, as shown in FIG. 1.

Referring to FIG. 3, at block 305 processing logic receives an object along with a request to store the object. The object may be any type of data. For example, the object may be a database record, one or more fields of a database record, an in memory data structure, or any other data. In one embodiment, the request is received by a proxy server that is configured to operate on objects and/or requests having a particular database format. Alternatively, the request may be received by a data grid node that is configured to operate on objects and requests having a particular format. In one embodiment, at block 310, processing logic determines whether the object and request have a format compliant with a protocol used by a data grid. If the request and/or object are not compliant with the protocol used by the data grid, then the method continues to block 315. Otherwise, the method proceeds to block 318. In another embodiment, block 310 is skipped, and the method proceeds directly from block 305 to block 315.

At block 315, processing logic translates the request and/or the object into the format that complies with the protocol used by the data grid. This may include wrapping the object in a Java object or a JSON object. The processing logic may comprise a proxy server that is configured to translate all incoming messages and/or objects received from clients from a particular database protocol or other protocol into a protocol used by the data grid. The proxy server may additionally be configured to translate messages and/or objects received from the data grid into the particular database protocol.

At block 318, processing logic performs object relational mapping for a data grid on the object. In one embodiment, at block 320 processing logic generates key value pairs for the fields of the object. If the object included any internal objects, then additional key value pairs may be generated for the fields of the internal objects. At block 322, processing logic links the key value pairs. One of the key value pairs may be a primary key value pair. Linking the key value pairs may include adding references to other key value pairs in the primary key value pair. Some of the referenced key value pairs may themselves be primary key value pairs. References may also be added to additional key value pairs within the additional primary key value pairs.

At block 325, processing logic stores the key value pairs in a data grid, which may be a distributed data grid. In one embodiment, processing logic stores the key value pairs in a distributed cache maintained by the data grid. In one embodiment, the processing logic stores the key value pairs in persistent storage (e.g., as files in a file system). The key value pairs may be stored on multiple different data grid nodes of the data grid.

Figure 4A:
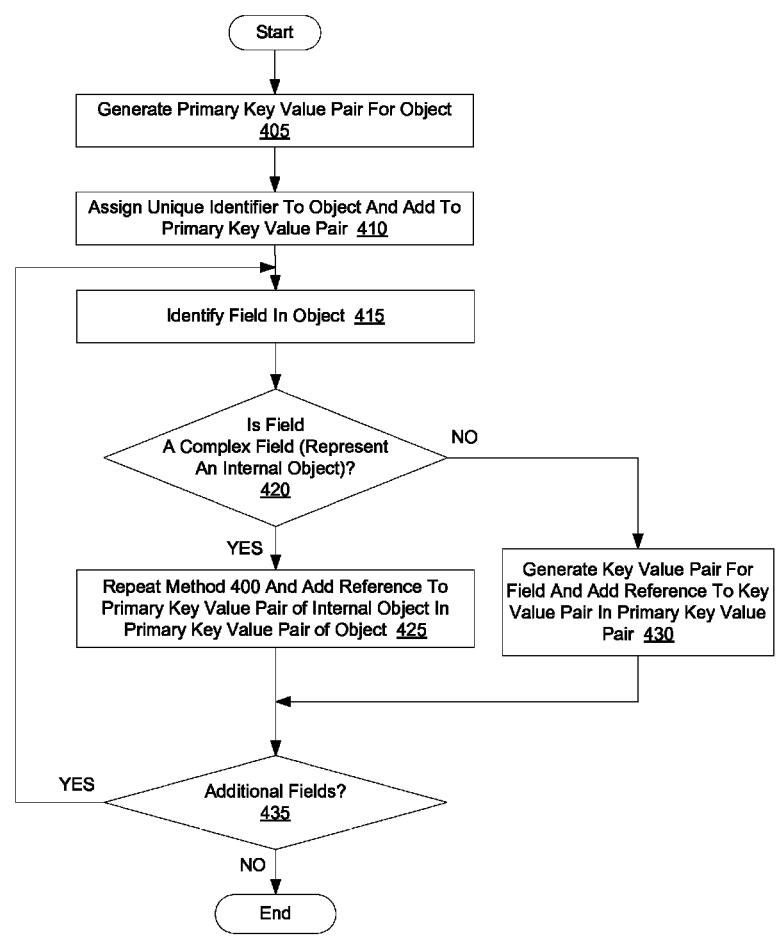
FIG. 4A illustrates a flow diagram of one embodiment for a method of performing object relational mapping for data grids.

FIG. 4A illustrates a flow diagram of one embodiment for a method 400 of performing object relational mapping for data grids. The method may be performed by processing logic that may comprise hardware (e.g., circuitry, dedicated logic, programmable logic, microcode, etc.), software (such as instructions run on a processing device), or a combination thereof. In one embodiment, method 400 is performed by a machine that includes a data grid node 125, as shown in FIG. 1. In one embodiment, method 400 corresponds to block 318 of method 300.

Referring to FIG. 4A, at block 405 processing logic generates a primary key value pair for a received object. At block 410, processing logic assigns a unique identifier to the object and adds the unique identifier to the primary key value pair. In one embodiment, the unique identifier is selected by a client. Alternatively, the unique identifier is selected by the processing logic (e.g., based on one or more fields of the object). In one embodiment, the key for the primary key value pair is the unique identifier.

At block 415, processing logic identifies a field in the object. The field may be a primitive field having a type such as a Boolean, an integer, a string, etc. Alternatively, the field may be a complex field having a type that corresponds to an internal object or an array. At block 420, processing logic determines whether the identified field is a complex field (e.g., is an internal object). If the field is a complex field, the method continues to block 425. Otherwise, the method continues to block 430.

At block 430, processing logic generates a key value pair for the field and adds a reference to the key value pair in the value portion of the primary key value pair. Therefore, the generated key value pair may be retrieved by a data grid node possessing the primary key value pair. The method then proceeds to block 435.

At block 425, processing logic repeats method 400 for the internal object of the complex field. This includes generating a primary key value pair for the internal object, assigning a unique identifier to the internal object, generating additional key value pairs for the internal object, and so on. A reference to the additional primary key value pair of the internal object is added into the value portion of the primary key value pair of the parent object. Therefore, the key value pairs for the internal object can be retrieved by a data grid node possessing the primary key value pair for the parent object. The method then proceeds to block 435.

At block 435, processing logic determines whether there are any additional fields in the object. If there are additional fields, then the method returns to block 415. Otherwise, the method ends.

Figure 4B:
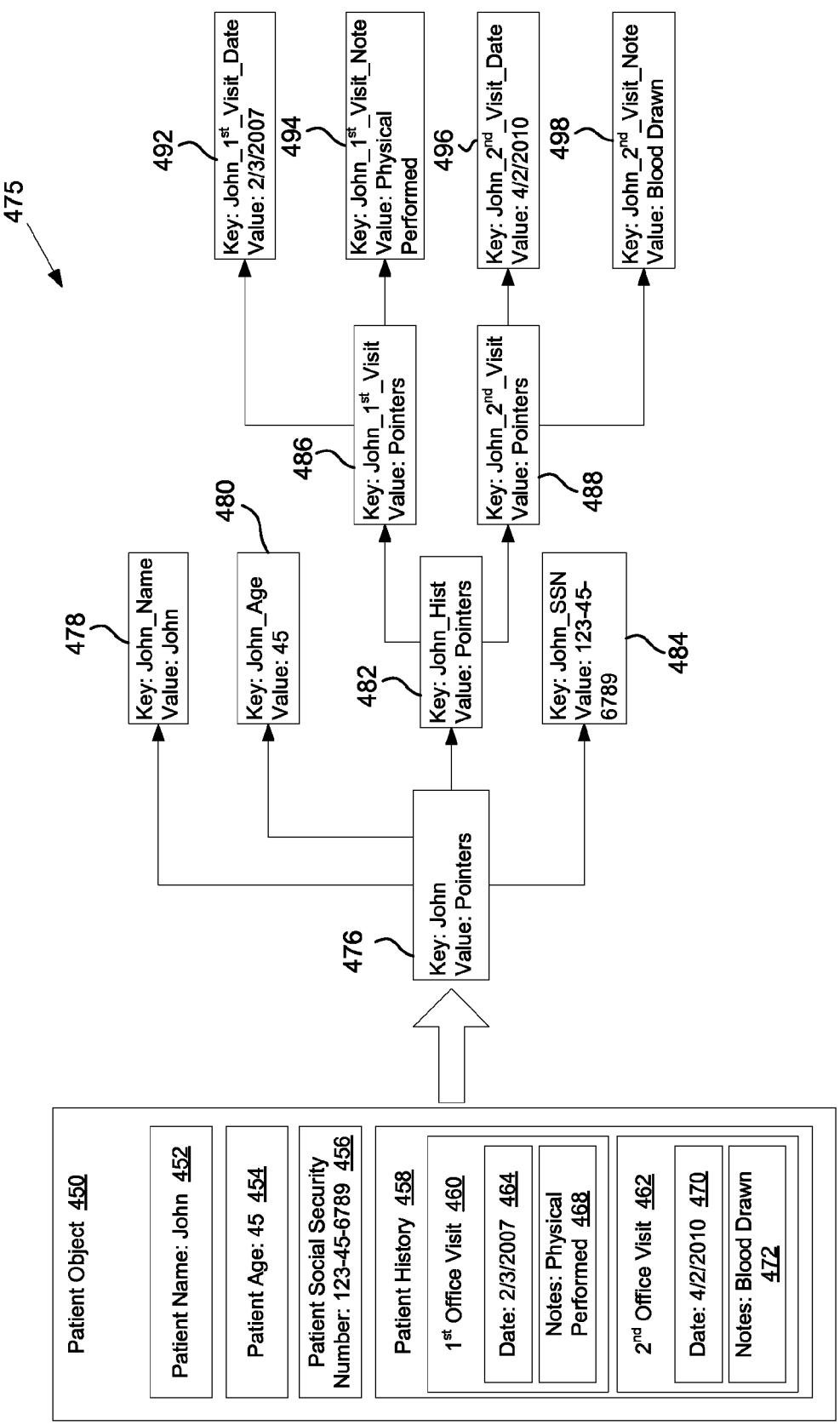
FIG. 4B illustrates an object and a collection of key value pairs generated from the object, in accordance with one embodiment of the present invention.

FIG. 4B illustrates an object 450 and a collection of key value pairs 475 generated from the object 450, in accordance with one embodiment of the present invention. As shown, the object 450 includes the following fields: patient name 452, patient age 454, patient social security number (SSN) 456 and patient history 458. Fields 452, 454, 456 have primitive types. However, the patient history field 458 is a complex field for an internal object. The internal object has a first office visit field 460 and a second office visit field 462, both of which are themselves complex fields for further internal objects. First office visit field 460 includes a date field 464 and a notes field 468. Similarly, second office visit field 462 includes a data field 470 and a notes field 472.

The collection of key value pairs 475 includes a primary key value pair 476. The primary key value pair 476 has a key of "John," which a data grid node can use to retrieve the primary key value pair 476. The primary key value pair's values are pointers to key value pairs 478, 480, 482, 484. Key value pairs 478, 480, 484 were generated from fields having primitive types. Therefore, the values of these key value pairs 478, 480, 484 are the contents of those fields.

Key value pair 482 was generated for an internal object (complex field 458). Therefore, key value pair 482 is a primary key value pair for the internal object. Key value pair 482 includes pointers to key value pairs 486, 488. Each of key value pairs 466, 468 is a primary key value pair for an additional nested object. Key value pair 486 includes pointers to key value pairs 492, 494. Key value pair 488 includes pointers to key value pairs 496, 498. Due to the pointers linking the key value pairs, a data grid node can retrieve all of the key value pairs and use them to reconstruct the object based on the unique identifier "John."

Figure 5:
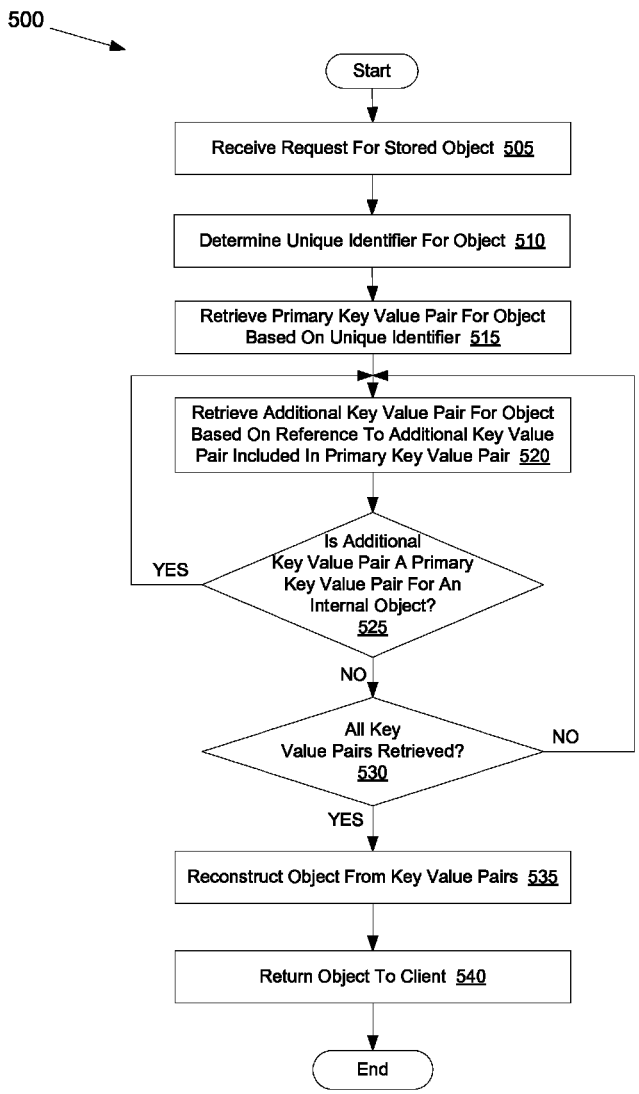
FIG. 5 illustrates a flow diagram of one embodiment for a method of returning an object stored in a distributed data grid to a client.

FIG. 5 illustrates a flow diagram of one embodiment for a method 500 of returning an object stored in a distributed data grid to a client. The method may be performed by processing logic that may comprise hardware (e.g., circuitry, dedicated logic, programmable logic, microcode, etc.), software (such as instructions run on a processing device), or a combination thereof. In one embodiment, method 500 is performed by a machine that includes a data grid node 125, as shown in FIG. 1.

Referring to FIG. 5, at block 505 processing logic receives a request for a stored object. At block 510, processing logic determines a unique identifier for the object. In one embodiment, the unique identifier is included in the request.

At block 515, processing logic retrieves a primary key value pair for the object based on the unique identifier. In one embodiment, the key for the primary key value pair is the unique identifier. The values in the primary key value pair may be references to other primary key value pairs. At block 520, processing logic retrieves an additional key value pair for the object based on the reference to that key value pair that is included in the primary key value pair.

At block 525, processing logic determines whether the additional retrieved key value pair is a primary key value pair for an internal object. If the additional key value pair is a primary key value pair for an internal object, the method returns to block 520 and processing logic retrieves an additional key value pair that is referenced by the primary key value pair of the internal object. If the additional key value pair is not for a primary key value pair of an internal object, the method continues to block 530.

At block 530, processing logic determines whether all key value pairs for the object (and all internal objects) have been retrieved. If all key value pairs have been retrieved, the method continues to block 535. Otherwise, the method returns to block 520.

At block 535, processing logic reconstructs the stored object from the key value pairs. At block 540, processing logic then returns the object to a client from which the request was received.

Figure 6:
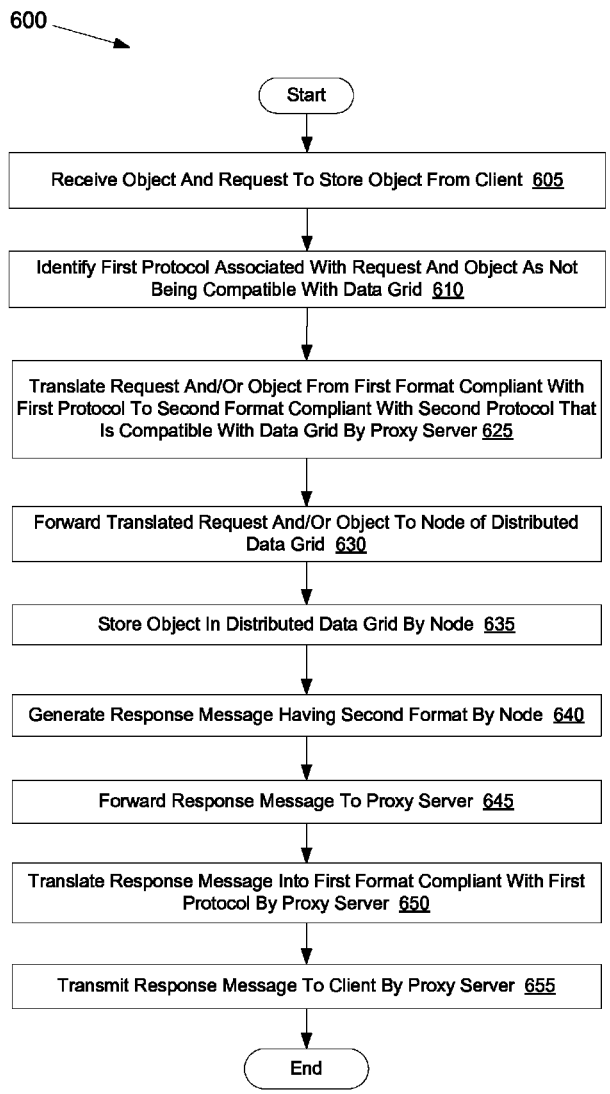
FIG. 6 illustrates a flow diagram of another embodiment for a method of storing an object in a distributed data grid.

FIG. 6 illustrates a flow diagram of another embodiment for a method 600 of storing object in a distributed data grid. The method may be performed by processing logic that may comprise hardware (e.g., circuitry, dedicated logic, programmable logic, microcode, etc.), software (such as instructions run on a processing device), or a combination thereof. In one embodiment, method 600 is performed by a machine that includes a data grid node 125 and/or proxy server, as shown in FIG. 1.

Referring to FIG. 6, at block 605 processing logic receives an object and a request to store the object from a client. In one embodiment, the request is received by a proxy server that is configured to operate using a predetermined protocol. At block 610, the proxy server identifies a first protocol associated with the request and the object as not being compatible with a data grid on which the object is stored. However, the identified first protocol is compatible with the proxy server.

At block 625, the proxy server translates the request and/or the object from the first format compliant with the first protocol to a second format compliant with a second protocol that is used by the data grid. At block 630, the proxy server forwards the translated request and/or object to a node of the data grid. The node may be collocated on a machine (e.g., a JVM) with the proxy server.

At block 635, the data grid node stores the object in the distributed data grid. In one embodiment, the data grid node divides the object into a collection of linked key value pairs, and these key value pairs are stored in the data grid. At block 640, the data grid node generates a response message having the second format compliant with the second protocol. At block 645, the data grid node forwards the response message to the proxy server.

At block 650, the proxy server translates the response message into the first format compliant with the first protocol. At block 655, the proxy server then sends the translated response message to the client. The method then ends.

Figure 7:
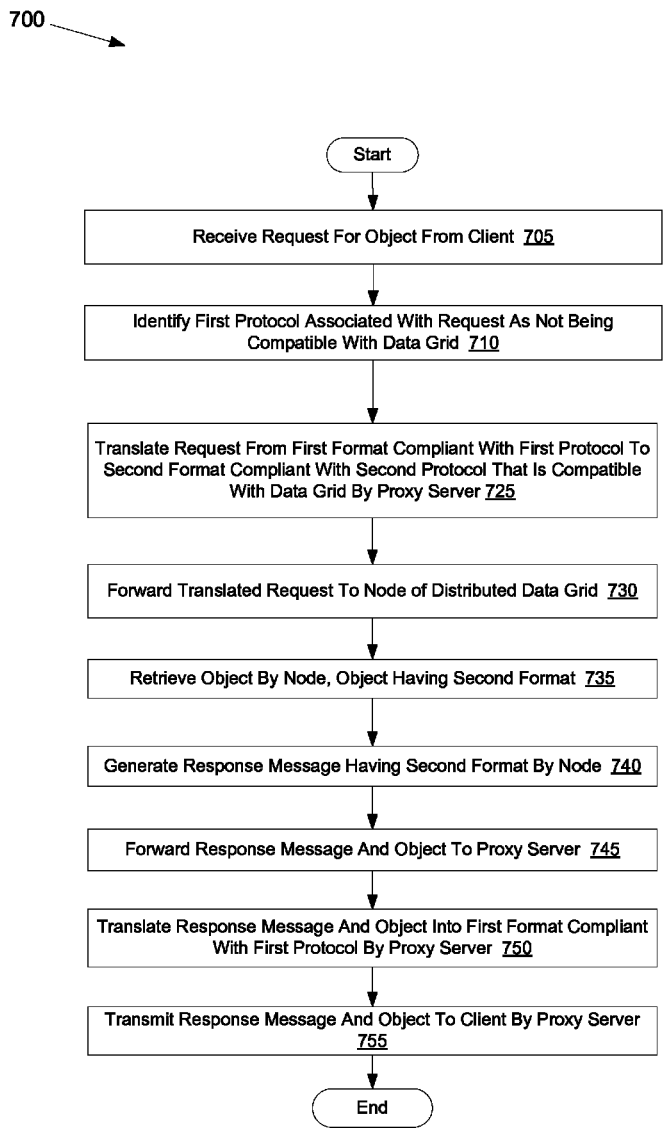
FIG. 7 illustrates a flow diagram of another embodiment for a method of returning an object stored in a distributed data grid to a client.

FIG. 7 illustrates a flow diagram of another embodiment for a method 700 of returning an object stored in a distributed data grid to a client. The method may be performed by processing logic that may comprise hardware (e.g., circuitry, dedicated logic, programmable logic, microcode, etc.), software (such as instructions run on a processing device), or a combination thereof. In one embodiment, method 700 is performed by a machine that includes a data grid node 125 and/or a proxy server, as shown in FIG. 1.

Referring to FIG. 7, at block 705 a proxy server receives a request for a stored object from a client. At block 710, the proxy server identifies that the request has a first format compliant with a first protocol. At block 725, the proxy server translates the request from the first format compliant with the first protocol to a second format compliant with a second protocol that is used by the data grid. At block 730, the proxy server forwards the request to a node of the data grid.

At block 735, the data grid node retrieves the object having the second format. This may include retrieving a collection of key value pairs and reconstructing the object from the key value pairs. At block 740, the data grid node generates a response message having the second format, the response message including the object. At block 745, the data grid node sends the response message and object to the proxy server.

At block 750, the proxy server translates the response message and the object into the first format compliant with the first protocol. At block 755, the proxy server sends the translated response message and object to the client. The method then ends.

Figure 8:
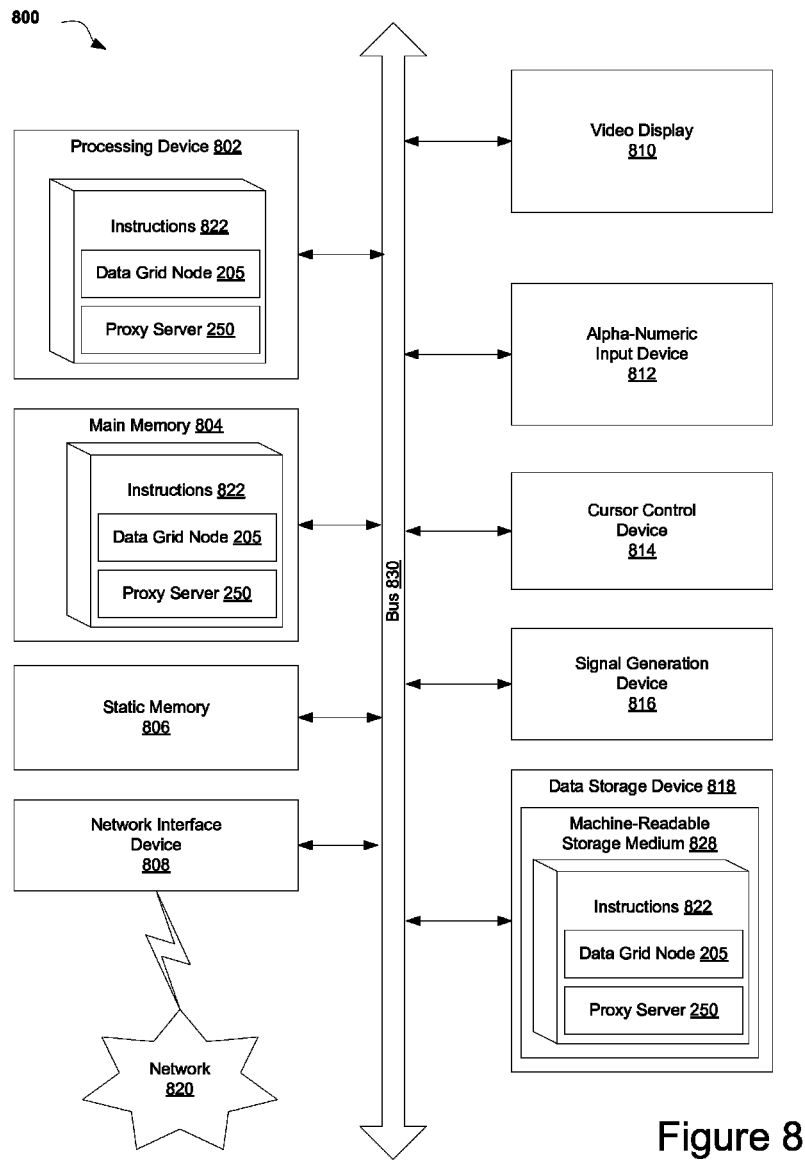
FIG. 8 illustrates a block diagram of an exemplary computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one embodiment, the instructions 822 include instructions for a data grid node and/or for a proxy server (e.g., data grid node 205 and proxy server 250 of FIG. 2) and/or a software library containing methods that call a data grid node and/or a proxy server. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for using a shared data store for peer discovery in a peer-to-peer system are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "acquiring" or "writing" or "reading" or "joining" or "querying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:
1. A method comprising:
receiving a first client request by a processing device comprising a node of a data grid, the first client request being a request to store an object in a database, wherein the first client request is formatted for interaction with a relational database using a database protocol, and wherein the data grid comprises a data store that spans a plurality of processing devices arranged in a distributed cluster to distribute data across the plurality of processing devices as a distributed cache to imitate the operation of the database to the client, the processing device being one of the plurality of processing devices, wherein the node executes within a virtual machine of a cloud computing system providing the data grid, the node communicating via a peer-to-peer protocol with other nodes executing on the plurality of processing devices in order to form the data grid;

identifying a format of the object and the first client request;

upon determining that the format of the object and the first client request does not comply with a protocol compatible with the data grid, translating the first client request and object into a format that complies with the protocol compatible with the data grid;

generating, by the processing device, a primary key value pair for the object and a plurality of additional key value pairs for fields of the object, the primary key value pair and the plurality of additional key value pairs comprising distinct data structures;

assigning, to a key portion of the primary key value pair, a unique identifier usable to retrieve the object from the data grid;

adding, to a value portion of the primary key value pair, references to the plurality of additional key value pairs;

storing the primary key value pair and the plurality of additional key value pairs in the data store of the data grid;

receiving a second client request for the object from a client, the second client request comprising the unique identifier;

using the unique identifier to retrieve the primary key value pair from the data grid;

retrieving the plurality of additional key value pairs in view of the references;

reconstructing the object from the plurality of additional key value pairs; and returning the object to the client.

2. The method of claim 1, wherein generating the plurality of additional key value pairs comprises:
identifying a complex field of the object, wherein the complex field comprises a plurality of sub-fields and represents an internal object; and
generating an additional key value pair for each sub-field of the complex field, wherein the key value pair generated for the complex field is designated as an additional primary key value pair and assigned an additional unique identifier.

3. The method of claim 2, further comprising:
adding into the additional primary key value pair references to the additional key value pairs generated for the sub-fields of the complex field.

4. The method of claim 1, further comprising:
generating copies of the key value pairs; and
distributing the copies across a plurality of nodes in the data grid.

5. The method of claim 1, further comprising:
using a peer-to-peer protocol to establish and manage membership of the data grid.

6. A non-transitory computer readable storage medium comprising instructions that, when executed by a processing device, cause the processing device to:
receive a first client request by the processing device, the processing device comprising a node of a data grid, wherein the first client request is a request to store an object in a database, the first client request formatted for interaction with a relational database using a database protocol, and wherein the data grid comprises a data store that spans a plurality of processing devices arranged in a distributed cluster to distribute data across the plurality of processing devices as a distributed cache to imitate the operation of the database to the client, the processing device being one of the plurality of processing devices, wherein the node executes within a virtual machine of a cloud computing system providing the data grid, the node communicating via a peer-to-peer protocol with other nodes executing on the plurality of processing devices in order to form the data grid;
identify a format of the object and the first client request;
upon determining that the format of the object and the first client request does not comply with a protocol compatible with the data grid, translate the first client request and object into a format that complies with the protocol compatible with the data grid;
divide, by the processing device, the object into a plurality of key value pairs, wherein each of the plurality of key value pairs comprises a distinct data structure;
link, by the processing device, the plurality of key value pairs;
designate a key value pair of the plurality of key value pairs as a primary key value pair;
assign a unique identifier to the primary key value pair;
store the plurality of key value pairs in the data store of the data grid;
receive a second client request for the object from a client, the second client request comprising the unique identifier;
use the unique identifier to retrieve the primary key value pair from the data grid, wherein the primary key value pair comprises references to additional key value pairs of the plurality of key value pairs;
retrieve the additional key value pairs in view of the references;
reconstruct the object from the plurality of key value pairs; and
return the object to the client.

7. The non-transitory computer readable storage medium of claim 6, wherein to divide the object into the plurality of key value pairs, the processing device is to:
generate a key value pair for each field of the object;
identify a complex field of the object, wherein the complex field comprises a plurality of sub-fields and represents an internal object; and
generate an additional key value pair for each sub-field of the complex field, wherein the key value pair generated for the complex field is designated as an additional primary key value pair and assigned an additional unique identifier.

8. The non-transitory computer readable storage medium of claim 7, wherein the processing device is further to:
add into the primary key value pair references to the key value pairs generated for the fields of the object; and
add into the additional primary key value pair references to the additional key value pairs generated for the sub-fields of the complex field.

9. The non-transitory computer readable storage medium of claim 6, wherein the processing device is further to:
generate copies of the key value pairs; and
distribute the copies across a plurality of nodes in the data grid.

10. A computing device comprising:
a memory to store instructions for a data grid node; and
a processing device, operatively coupled to the memory, to execute the instructions, wherein execution of the instructions causes the computing device to be a node of a data grid, the data grid comprising a data store that spans a plurality of computing devices arranged in a distributed cluster to distribute data across the plurality of processing devices as a distributed cache to imitate the operation of a relational database to clients, the computing device being one of the plurality of computing devices, wherein the node executes within a virtual machine of a cloud computing system providing the data grid, the node communicating via a peer-to-peer protocol with other nodes executing on the plurality of processing devices in order to form the data grid, the processing device to:

receive a first client request to store an object in a database, the first client request comprising the object, wherein the first client request is formatted for interaction with a relational database using a database protocol;

identify a format of the object and the first client request;

upon determining that the format of the object and the first client request does not comply with a protocol compatible with the data grid, translate the first client request and object into a format that complies with the protocol compatible with the data grid;

divide the object into a plurality of key value pairs, wherein each of the plurality of key value pairs comprises a distinct data structure;

link the plurality of key value pairs;

designate a key value pair of the plurality of key value pairs as a primary key value pair;

assign a unique identifier to the primary key value pair;

store the plurality of key value pairs in the data store of the data grid;

receive a second client request for the object from a client, the second client request comprising the unique identifier;

use the unique identifier to retrieve the primary key value pair from the data grid, wherein the primary key value pair comprises references to additional key value pairs of the plurality of key value pairs;

retrieve the additional key value pairs in view of the references;

reconstruct the object from the plurality of key value pairs; and return the object to the client.

11. The computing device of claim 10, wherein to divide the object into the plurality of key value pairs, the processing device is to:

generate a key value pair for each field of the object;

identify a complex field of the object, wherein the complex field comprises a plurality of sub-fields and represents an internal object; and generate an additional key value pair for each sub-field of the complex field, wherein the key value pair generated for the complex field is designated as an additional primary key value pair and assigned an additional unique identifier.

12. The computing device of claim 11, wherein the processing device is further to:

add into the primary key value pair references to the key value pairs generated for the fields of the object; and add into the additional primary key value pair references to the additional key value pairs generated for the sub-fields of the complex field.

13. The computing device of claim 10, wherein the processing device is further to:

generate copies of the key value pairs; and distribute the copies across a plurality of nodes in the data grid.

* * * * *